United States Patent
Eriksson

(10) Patent No.: US 8,757,196 B2
(45) Date of Patent: Jun. 24, 2014

(54) FLUID VALVE ARRANGEMENT

(71) Applicant: Paker-Hannifin Corporation, Cleveland, OH (US)

(72) Inventor: Björn Eriksson, Linkoping (SE)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/671,962

(22) Filed: Nov. 8, 2012

(65) Prior Publication Data

US 2013/0074955 A1 Mar. 28, 2013

Related U.S. Application Data

(60) Division of application No. 12/900,860, filed on Oct. 8, 2010, now abandoned, which is a continuation of application No. PCT/SE2007/050486, filed on Jul. 2, 2007.

(51) Int. Cl.
*F16K 17/34* (2006.01)

(52) U.S. Cl.
USPC .......... 137/484.2; 137/501; 137/512; 137/554

(58) Field of Classification Search
USPC ........ 137/500, 501, 493.8, 512.1, 106, 484.2, 137/554
See application file for complete search history.

(56) References Cited

U.S. PATENT DOCUMENTS

| | | | |
|---|---|---|---|
| 2,570,937 A * | 10/1951 | Gash | 137/493.8 |
| 2,881,793 A | 4/1959 | Lee | |
| 3,213,886 A * | 10/1965 | Pearne | 137/625.69 |
| 3,370,513 A | 2/1968 | Shore | |
| 3,770,007 A | 11/1973 | Orth et al. | |
| 3,840,049 A | 10/1974 | Field, Jr. | |
| 4,195,552 A * | 4/1980 | Neff | 91/443 |
| 4,422,470 A | 12/1983 | Jackson et al. | |

(Continued)

FOREIGN PATENT DOCUMENTS

| | | |
|---|---|---|
| DE | 102006046125 | 4/2008 |
| EP | 1 722 110 | 11/2006 |

(Continued)

OTHER PUBLICATIONS

International Search Report of corresponding International Application No. PCT/SE2007/050486, dated Apr. 9, 2008.

*Primary Examiner* — William McCalister

(74) *Attorney, Agent, or Firm* — Renner, Otto, Boisselle & Sklar, LLP

(57) ABSTRACT

A pressure controlling valve includes a slidable spool arranged to be spring loaded towards a neutral position. A first port and a second port are connected to allow a fluid flow through the valve. A first and a second pilot port are connected to a cavity adjacent a respective first and second end surface of the spool. The pilot ports are connected to a fluid conduit on either side of a fluid device causing a pressure drop in the fluid conduit and the fluid device is connected to one of the first or second ports. The spool is displaced against the spring load in response to a pressure difference between the first and the second pilot port, whereby a control surface of the spool is arranged to restrict the fluid flow through the valve when the control surface approaches a central cavity.

9 Claims, 6 Drawing Sheets

(56) References Cited

U.S. PATENT DOCUMENTS

| | | | | |
|---|---|---|---|---|
| 5,183,071 | A | * | 2/1993 | Ogawa ........................ 137/106 |
| 5,568,759 | A | | 10/1996 | Aardema |
| 7,066,446 | B2 | | 6/2006 | Nielsen |
| 2006/0156713 | A1 | | 7/2006 | Kadlicko |
| 2007/0079609 | A1 | | 4/2007 | Brinkman et al. |
| 2009/0266067 | A1 | | 10/2009 | Persson et al. |

FOREIGN PATENT DOCUMENTS

| | | |
|---|---|---|
| EP | 1 895 168 | 5/2008 |
| GB | 2 406 363 | 3/2005 |
| WO | 2008037461 | 9/2008 |
| WO | 2009005425 | 7/2009 |

* cited by examiner

FLUID VALVE ARRANGEMENT

CROSS-REFERENCE TO RELATED CASES

This application is a continuation of International Patent Application No. PCT/SE2007/050486 filed Jul. 2, 2007, which is herein incorporated by reference.

TECHNICAL FIELD

The invention relates to a pressure controlling valve for controlling a pressure drop across the valve, said valve comprising a valve body having a slidable spool arranged to be spring loaded towards a neutral position in said valve body. The invention further relates to a fluid valve arrangement comprising such a pressure controlling valve

BACKGROUND ART

In fluid circuits, such as hydraulic and pneumatic circuits, it is often desirable to maintain a constant pressure over a fluid device, such as a throttle valve or similar. Conventionally this has been achieved by providing a pressure controlling valve located in the fluid circuit before, or after, the fluid device. The pressure controlling valve is a pressure controlled valve that is controlled by the pressure drop across the fluid device. Pilot pressure conduits are connected upstream and downstream of the fluid device and the pilot pressures act on a spring loaded spool in the pressure controlling valve. The fluid device may be a throttle valve arranged to provide a set pressure drop. The spring load in the pressure controlling valve is selected so that the spool is maintained in a predetermined position. If the pressure drop increases or decreases, the pressure difference between the pilot pressure conduits will cause the spool to move to close or open the pressure controlling valve in order to maintain a constant pressure across the throttle valve.

This type of pressure controlling valve is arranged to control the pressure drop in one direction of flow through the fluid circuit. Recent developments in fluid circuit control have created a need for more energy efficient operation of fluid devices and circuits, including a need for recovering fluid pressure for regenerative purposes in order to minimize pressure and flow losses. Fluid circuits of this type may be provided with means for controlling fluid pressure in both directions. In order to achieve this, a circuit as described above must be provided with two pressure controlling valves, connected so that the valves may control the pressure drop in opposite directions of fluid flow.

One problem with this arrangement is that an additional valve is required for each such location in a fluid circuit, increasing the cost, complexity and weight of the fluid circuit.

DISCLOSURE OF INVENTION

The above problem has been solved by a pressure controlling valve and an arrangement according to the appended claims.

According to one embodiment, the invention relates to a pressure controlling valve comprising a valve body having a slidable spool arranged to be spring loaded towards a neutral position in said valve body. The valve body may have a first port and a second port for a fluid, said first and second ports being connected to allow a fluid flow through the valve. The first and second ports are connected to fluid conduits, wherein fluid may flow in both directions. A first pilot port may be connected to a pilot cavity arranged in the valve body adjacent a first end surface of the spool, and a second pilot port may be connected to a similar pilot cavity adjacent an opposite, second end surface of the spool. The said pilot ports may be connected to a fluid conduit on either side of a fluid device causing a pressure drop in said fluid conduit, which fluid device may be connected to either one of the first or second ports.

The spool comprises a first and a second control surface located in a first and a second cavity, respectively, which first and second cavity has a cross-sectional area that is larger than the cross-sectional area of the spool. The first and the second cavity may be connected by a third cavity, which third cavity has a cross-sectional area that is preferably, but not necessarily, equal to the cross-sectional area of the spool. According to one example, the said cross-sectional areas are at least substantially equal, allowing the sections of the spool comprising a control surface to move into the third cavity to prevent fluid flow through the valve. According to a further example, each control surface may contact a first or a second seat facing its respective first and second control surface, to prevent fluid flow through the valve. The seats may be located inside the third cavity or adjacent an opening where the third cavity opens up into the respective first and second cavities. In order to allow fluid to flow between the first and second ports, a central section of the spool has a reduced diameter between the control surfaces. The spool may be operable to be displaced against the spring load in response to a pressure difference exceeding a predetermined value between the first and the second pilot port. The first and the second cavity is located remote from the respective first and second pilot cavities at the first and second ends of the spool.

When the pressure difference between the first and second pilot cavities exceed a predetermined value, the force exerted on the end of the spool will be greater than the force exerted by the spring load acting on the spool to maintain it in its neutral position. The spool will then be displaced against the spring load and its first or second control surface, depending on the direction of the displacement, is arranged to restrict the fluid flow through the valve when the first or the second control surface approaches the third cavity.

As long as the pressure difference acting on the pressure controlling valve in a first direction is below a predetermined maximum value, the first control surface is arranged to restrict the fluid flow through the valve in a first direction when the first control surface approaches the third cavity, in order to maintain a constant pressure drop. Similarly, when the pressure drop occurs in the opposite direction, the second control surface is arranged to restrict the fluid flow through the valve in an opposite, second direction when the second control surface approaches the third cavity.

When the pressure drop exceeds said maximum value, the valve is no longer able to maintain a constant pressure drop. In this case, the first control surface is arranged to prevent fluid flow through the valve in a first direction when the part of the spool comprising the first control surface enters the third cavity, or contacts the first seat. Similarly, when the pressure drop occurs in the opposite direction, the second control surface is arranged to prevent fluid flow through the valve in an opposite, second direction when the part of the spool comprising the second control surface enters the third cavity, or contacts the second seat.

The first and the second control surface are preferably, but not necessarily, arranged facing each other on opposite sides of the third cavity. The control surfaces may comprise annular surfaces arranged at substantially right angles to the main axis of the spool, separated by a portion of the spool having a reduced diameter. In order to allow the flow through between the first and second ports to be interrupted gradually in a controlled manner, the spool may comprise flow controlling recesses in its outer periphery adjacent each control surface. Alternatively, the flow controlling recesses may be located in or adjacent the inner periphery of the said first and second seats in or adjacent the third cavity. The recesses have a cross-sectional area that increases in the direction of, and intersects, the respective first and second control surface. The recesses may have any suitable shape, such as a V-shape, semi-circular shape or rectangular shape.

The spring load acting on the spool may preferably, but not necessarily, be a coil spring. According to a first embodiment, the spool is spring loaded in a first direction by a first spring arranged at the first end of the spool, which spring is retained between the valve body and the first end of the spool. Similarly, the spool is spring loaded in an opposite, second direction by a second spring arranged at the second end of the spool. The second spring is retained between the valve body and the second end of the spool. When the pressure drop across the pressure controlling valve is less than the pressure required to move the spool against the pre-load of one of the first or the second spring, the spool will remain in its neutral position. In the above example, the spool is preferably only acted on by one of the said springs at the time.

According to one example, the pressure controlling valve can be arranged to maintain the same pressure drop in both directions of fluid flow. In this case, the first and second spring have the same spring constant and the same pre-load is applied on each spring.

According to a further example, the pressure controlling valve can be arranged to maintain pressure drops of different magnitudes in the respective first and second directions of fluid flow. This is achieved by providing a first and a second spring having different levels of pre-loading. This arrangement may allow a predetermined pressure drop in a first direction of flow through the valve, while the pressure drop in the opposite, second direction can be higher if the pre-load on the coil spring acting against the latter pressure drop is correspondingly higher.

According to a second embodiment, the spool is spring loaded in the first and the second direction by a single spring arranged at the one end of the spool. This may be achieved by a single spring attached to one end of the spool, wherein the spring can interact with axially separated stops arranged in the valve body. When the pressure drop across the pressure controlling valve is less than the pressure required to move the spool against the pre-load of the spring, the spool will remain in its neutral position. In the above example, the spool is acted on by the said spring as soon as it is displaced from the neutral position.

The invention further relates to a fluid valve arrangement comprising: a fluid conduit arrangement having a first conduit and a second conduit, the first conduit being connectable with a supply of fluid pressure and the second conduit being connectable with a hydraulic consumer. The fluid valve arrangement comprises a pressure controlling valve as described above, and a fluid device causing a pressure drop between said first and second fluid conduits. The fluid device is connected to one of the first or second ports of the pressure controlling valve, and the pilot ports of the pressure controlling valve are connected to fluid conduits on either side of the fluid device. The pressure controlling valve is arranged to control the pressure drop across the fluid device irrespective of the direction of fluid flow.

In the subsequent text, the term 'fluid consumer' is used as a collective name for all fluid consuming devices, such as hydraulic or pneumatic piston-cylinder arrangements and hydraulic motors, that may be operated using this valve arrangement.

According to a first example, the fluid device may comprise a throttle valve. The throttle valve may controllable in order to increase or reduce the pressure drop across the throttle valve.

According to a second example, the fluid device may comprise a pair of controllable two-way valves connected in parallel between the first and second pilot conduits. Each two-way valve may also be provided with a separate or integrated non-return valve, wherein the two-way valves may control the fluid flow in opposite directions.

According to a third example, the fluid device may comprise a controllable three-way valve with a closed centre. The valve spool be provided with a pair of integrated non-return valves, wherein the valve may control the fluid flow in opposite directions The valve arrangement may also comprise an electronic control unit for controlling at least the fluid device described above. The magnitude and direction of said pressure drop may be determined using an opening degree sensor in the pressure controlling valve, in particular by detecting the position of a spool in the pressure controlling valve. The spool in the pressure controlling valve may comprise an opening degree sensor which determines the position of the spool. According to one example, the pressure controlling valve has the form of a spool valve, and the opening degree sensor is a position sensor, which determines a position of the spool. A certain opening degree of the valve is allocated to each position of the spool, wherein the position of the spool permits an indirect determination of the opening degree. A Hall-sensor, an LVDT (linear variable differential transducer) or any other suitable sensor can be used as position sensor. The control unit considers a non-linear correlation between the position of the spool and the opening degree of the valve arrangement. Such a correlation can, for example, be stored as a function or as a table, so that it is simple for the control unit to convert the position of the spool to an opening degree and a corresponding pressure drop.

In this way the output signal from each opening degree sensor allows the control device to determine the magnitude and direction of a pressure drop across the valve arrangement. For instance, the control unit may determine that the pressure in the conduit from the fluid consumer is greater than the pressure in the supply connection. Depending on the desired direction of operation of the hydraulic consumer, a valve arrangement comprising a pair of controllable two-way valves or a controllable three-way valve, as described above, can be controlled to select a regenerative mode during operation of the fluid consumer. This allows a relatively higher pressure from the fluid consumer to be regenerated by opening an appropriate controllable valve and returning pressurized fluid to the pressure connection.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

EMBODIMENTS OF THE INVENTION

Figure 1:
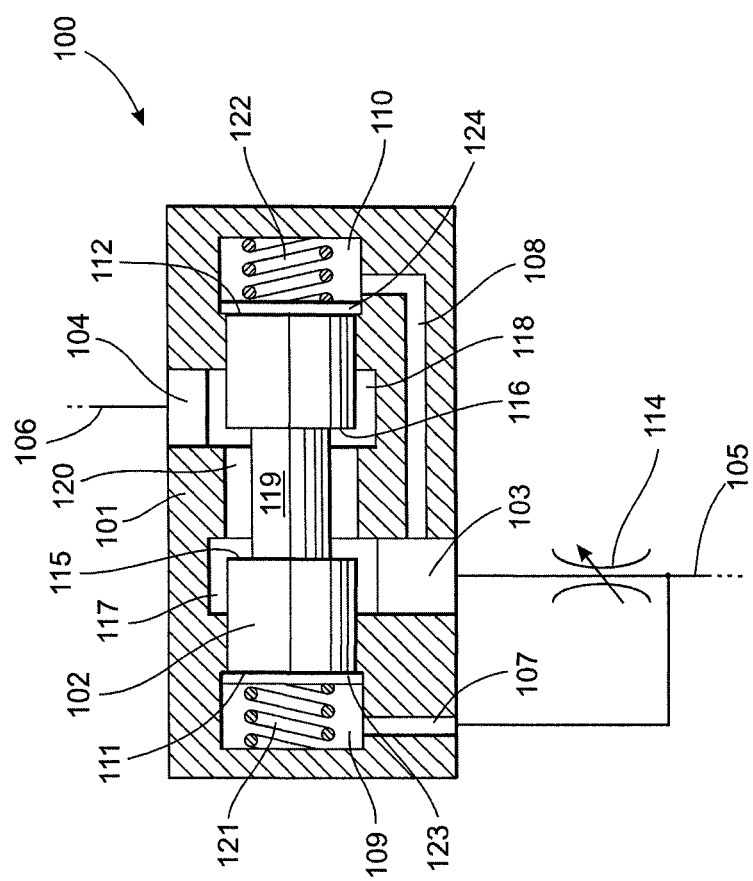
FIG. 1 shows a schematic diagram of a pressure controlling valve according to one embodiment of the invention.

FIG. 1 shows a schematic diagram of a pressure controlling valve 100 according to one embodiment of the invention. According to this embodiment, the pressure controlling valve comprises a valve body 101 having a slidable spool 102 arranged to be spring loaded towards a neutral position in said valve body 101. The valve body 101 has a first port 103 and a second port 104 for fluid, said first and second ports 103, 104 being connected to allow a fluid flow through the valve. The first and second ports 103, 104 are connected to fluid conduits 105, 106, wherein fluid can flow in both directions. A first pilot port 107 is connected to a pilot cavity 109 arranged in the valve body 101 adjacent a first end surface 111 of the spool 102, and a second pilot port 108 is connected to a similar pilot cavity 110 adjacent an opposite, second end surface 112 of the spool 102. The said pilot ports 107, 108 are connected to a first fluid 105 conduit, on either side of a fluid device 114 causing a pressure drop in said fluid conduit 105, 106. In this example the fluid device is a controllable throttle valve 114 connected to the first port 103.

Alternatively, it is also possible to connect the throttle valve to the second port, and to connect a source of fluid pressure to either of the first or second ports, while maintaining the function of the pressure controlling valve.

The spool 102 comprises a first and a second control surface 115, 116 located in a first and a second cavity 117, 118, respectively, which first and second cavity 117, 118 has a cross-sectional area that is larger than the cross-sectional area of the spool 102. The first and the second cavity 117, 118 are connected by a third cavity 120, which third cavity 120 has a cross-sectional area that is equal to the cross-sectional area of the spool 102, allowing the sections of the spool 102 comprising a control surface 115, 116 to move into the third cavity. In order to allow fluid to flow between the first and second ports 102, 103, a central section 119 of the spool 102 has a reduced diameter between the control surfaces 115, 116. The spool 102 may be operable to be displaced against the spring load in response to a pressure difference exceeding a predetermined value between the first and the second pilot port 107, 108. The first and the second cavity 117, 118 is located remote from the respective first and second pilot cavities 109, 110 at the first and second ends 111, 112 of the spool 102.

FIG. 1 shows the pressure controlling valve 100 with the spool 102 in its neutral position. The spool 102 is maintained in this position by a first and a second spring 121, 122. The springs 121, 122 are maintained in their respective position between an outer end surface of the respective pilot cavity 109, 110 and a locking washer 123, 124. When the spool 102 is in its neutral position, the springs 121, 122 are arranged to hold the locking washers 123, 124 in contact with a stop located in the internal peripheral surface delimiting the first and second pilot cavities 109, 110, as well as the respective end surface 111, 112 of the spool 102.

A pressure difference between the first and the second conduit 105, 106 is caused by the throttling effect of the throttle valve 114. The pressure drop across the throttle valve 114 causes a pressure difference between the first and the second pilot ports 107, 108 and their respective first and second pilot cavities 109, 110.

Figure 2:
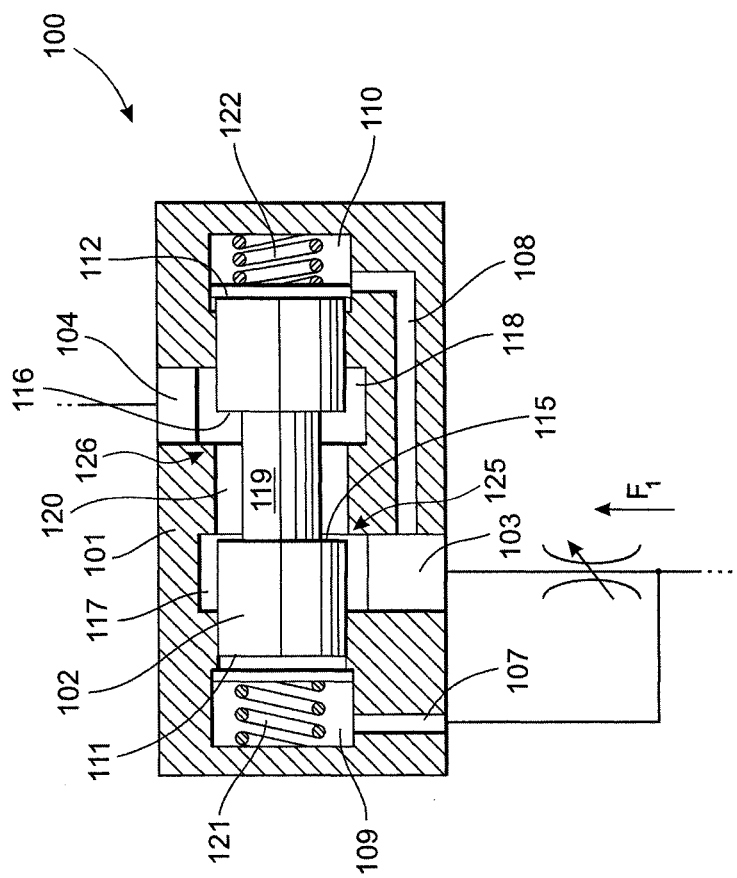
FIG. 2 shows the pressure controlling valve of FIG. 1 in operation.

When the pressure difference between the first and second pilot cavities 109, 110, exceeds a predetermined value, the force exerted on the end of the spool 102 will be greater than the force exerted by the spring load acting on the spool 102 to maintain it in its neutral position. FIG. 2 shows the pressure controlling valve of FIG. 1 in operation, wherein the flow direction $F_1$ and the pressure drop occurs from the first conduit 105 to the second conduit 106. The spool 102 will then be displaced against the second spring 122 and the first control surface 115 is arranged to restrict the fluid flow through the valve when the first control surface 115 approaches a first control edge 125 between the first cavity 117 and the third cavity 120. A similar second control edge 126 for cooperating with the second control surface 116 is located between the second cavity 118 and the third cavity 120.

As long as the pressure difference acting on the pressure controlling valve in the first direction, shown in FIG. 2, is below a predetermined maximum value, the first control surface 115 is arranged to restrict the fluid flow through the valve 100 in a first flow direction $F_1$ when the first control surface 115 approaches the first control edge 125 and the third cavity 120, in order to maintain a constant pressure drop. Similarly, when the pressure drop occurs in the opposite direction, the second control surface 116 is arranged to restrict the fluid flow through the valve in an opposite, second direction when the second control surface 116 approaches second control edge 126 and the third cavity 120.

When the pressure drop exceeds said maximum value, the valve is no longer able to maintain a constant pressure drop. In this case, the first control surface 115 is arranged to prevent fluid flow through the valve in the first direction $F_1$ when the part of the spool 102 comprising the first control surface 115 enters the third cavity 120. Similarly, when the pressure drop occurs in the opposite direction, the second control surface 116 is arranged to prevent fluid flow through the valve in an opposite, second direction when the part of the spool 102 comprising the second control surface 116 enters the third cavity 120.

Figure 3:
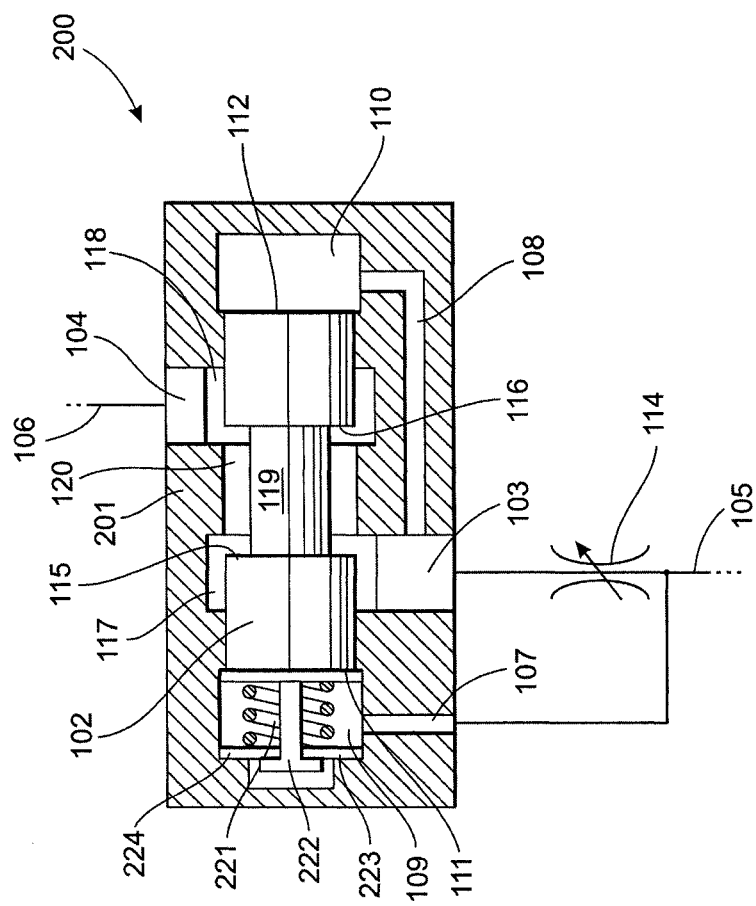
FIG. 3 shows a schematic diagram of a pressure controlling valve according to a further embodiment of the invention.

FIG. 3 shows a schematic diagram of a pressure controlling valve 200 according to a further embodiment of the invention. The pressure controlling valve 200 of FIG. 2 differs from the valve 100 of FIG. 1 in that the spring load on the valve 200 is caused by a single spring 221. For those parts where the component parts are identical to those of FIG. 1, the reference numerals of FIG. 1 will be used. The basic function of the spool 102 for maintaining a constant pressure drop across the pressure controlling valve 200 in FIG. 3 is, for all practical purposes, identical to that of FIG. 1.

The spool 102 is maintained in its neutral position by a single spring 221 located at the first end of the spool. The spring 221 is maintained in this position between a first and a second locking washer 223, 224. The first locking washer 223 is located against a stop in the internal peripheral surface delimiting the first and second pilot cavities 109, 110 adjacent the first end surface 111 of the spool 102. The second locking washer 224 is located against a stop adjacent an outer end surface of the first pilot cavity 109. A retaining member 222 is attached to the first end surface 111 of the spool 102, which retaining member 222 extends away from said end surface 111, and through an opening in the second washer 224. An enlarged portion of the retaining member 222 is in contact with a rear surface of the second washer 224. This allows the second washer to be displaced together with the spool 102 and the spring 221 to be compressed when the spool 102 is displaced in a direction away from the first pilot cavity 109 in response to a relatively higher pressure in the first conduit 105. When the spool 102 is in its neutral position, the spring 221 is arranged to hold the locking washers 223, 224 in contact with their opposed stops in the first pilot cavity 109, as well as the end surface 111 of the spool 102.

Figure 4:
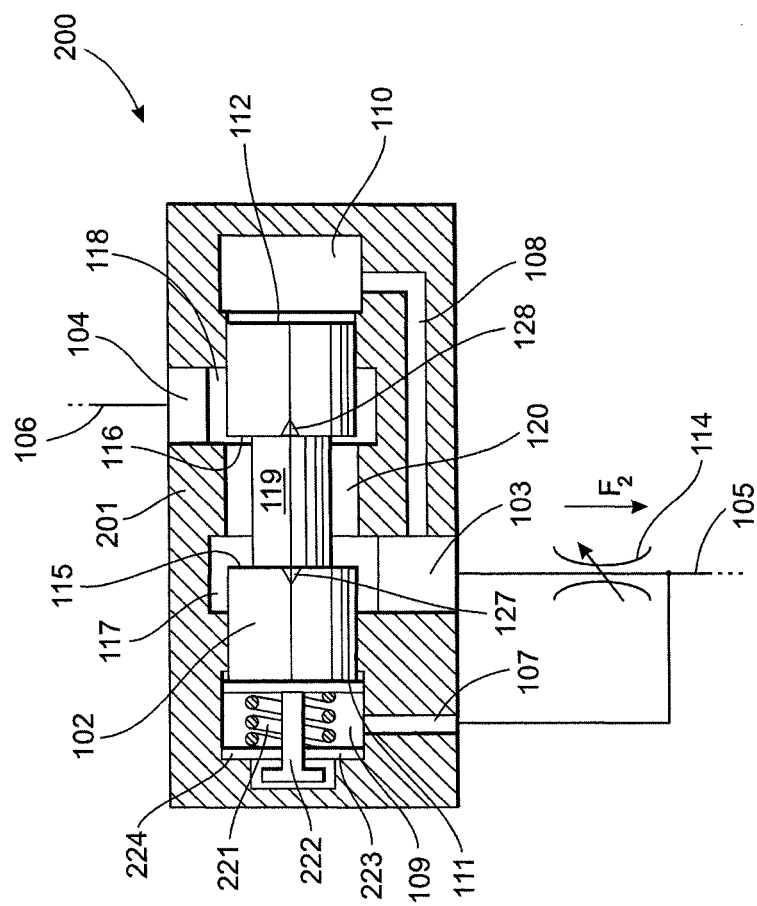
FIG. 4 shows the pressure controlling valve of FIG. 3 in operation.

FIG. 4 shows the pressure controlling valve of FIG. 1 in operation, wherein the flow direction $F_2$ and the pressure drop occurs from the second conduit 106 to the first conduit 105. The increased pressure in the second pilot cavity 110 will cause the spool 102 to be displaced against the spring 221. The first end surface 111 of the spool 102 will displace the first washer 223 towards the stationary second washer 224, compressing the spring 221. The enlarged portion of the retaining member 222 will move out of contact with the second washer 224 and into a cavity provided for this purpose. The second control surface 116 is arranged to restrict the fluid flow through the valve when the first control surface 116 approaches a first control edge 126 between the second cavity 118 and the third cavity 120.

As long as the pressure difference acting on the pressure controlling valve in the second direction $F_2$, shown in FIG. 4, is below a predetermined maximum value, the first control surface 116 is arranged to restrict the fluid flow through the valve 200 in the second flow direction $F_2$ as the second control surface 116 approaches second control edge 126 and the third cavity 120. When the pressure drop exceeds said maximum value, the valve is no longer able to maintain a constant pressure drop. In this case, the second control surface 116 is arranged to prevent fluid flow through the valve in an opposite, second direction when the part of the spool 102 comprising the second control surface 116 enters the third cavity 120.

The first and the second control surface 115, 116 are arranged facing each other on opposite sides of the third cavity 120. The control surfaces comprise annular surfaces arranged at substantially right angles to the main axis of the spool 102, separated by a portion 119 of the spool 102 having a reduced diameter. In order to allow the flow through between the first and second ports to be interrupted gradually in a controlled manner, the spool comprises a number of flow controlling recesses 127, 128 in its outer periphery. FIG. 4 shows four recesses in the outer periphery of the spool 102 adjacent each control surface, which recesses have a cross-sectional area that increases in the direction of, and intersects, the respective first and second control surface 115, 116. The recesses are preferably spaced at equal distance around said outer periphery, and may have any suitable shape, such as a V-shape, semi-circular shape or rectangular shape.

The embodiments of FIGS. 1-4 show a fluid valve arrangement where the pressure controlling valve connected across a fluid device in the form of a controllable throttle valve 114.

Figure 5:
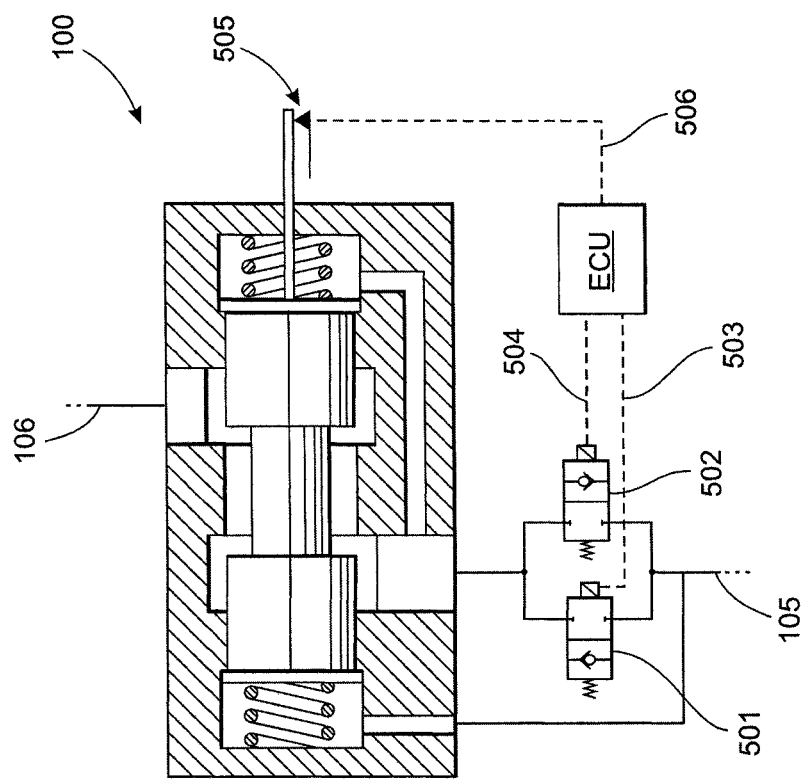
FIG. 5 shows a valve arrangement according to a first example.

A second example is illustrated in FIG. 5, showing a fluid valve arrangement using the pressure controlling valve 100 of FIG. 1, where the fluid device comprises a first and a second controllable two-way valve 501, 502 connected in parallel between the first and second pilot conduits 107, 108. Each two-way valve 501, 502 is provided with integrated non-return valve, whereby the two-way valves 501, 502 can control the fluid flow in opposite directions.

Figure 6:
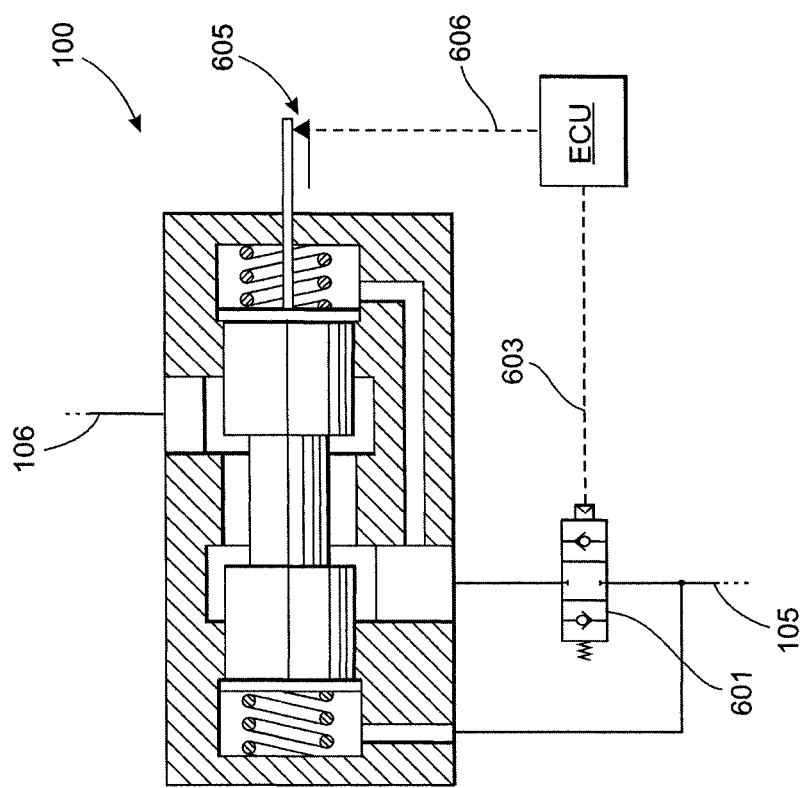
FIG. 6 shows a valve arrangement according to a second example.

A third example is illustrated in FIG. 6, showing a fluid valve arrangement using the pressure controlling valve 100 of FIG. 1, where the fluid device comprises a controllable three-way valve 601 with a closed centre. The valve spool is provided with a pair of integrated non-return valves, whereby the valve can control the fluid flow in opposite directions The valve arrangements in FIGS. 5 and 6 can comprise an electronic control unit ECU for controlling at least the valves 501, 502; 601 described above. The connections between the electronic control unit ECU and the respective valves 501, 502; 601 are indicated with dashed lines 503, 504; 603. The magnitude and direction of the pressure drop across the valve arrangement is determined using an opening degree sensor 505, 605 in the pressure controlling valve, in particular by detecting the position of the spool 102 in the pressure controlling valve 100. For this purpose, one end of the spool 102 is provided the opening degree sensor in the form of a position sensor 505, 605, schematically indicated in FIGS. 5 and 6, which sensor determines the position of the spool 102. The connections between the electronic control unit ECU and the respective position sensor 505, 605 are indicated with dashed lines 506, 606. A certain opening degree of the pressure controlling valve is allocated to each position of the spool, wherein the position of the spool permits an indirect determination of the opening degree. A Hall-sensor, an LVDT (linear variable differential transducer) or any other suitable sensor can be used as position sensor. The electronic control unit ECU considers a non-linear correlation between the position of the spool and the opening degree of the valve arrangement. Such a correlation can, for example, be stored as a function or as a table, so that it is simple for the electronic control unit ECU to convert the position of the spool to an opening degree and a corresponding pressure drop.

In this way the output signal from each opening degree sensor 505, 605 allows the electronic control unit ECU to determine the magnitude and direction of a pressure drop across the valve arrangement. For instance, the electronic control unit ECU may determine that the pressure in the conduit from the fluid consumer is greater than the pressure in the supply connection. Depending on the desired direction of operation of the fluid consumer, a valve arrangement comprising a pair of controllable two-way valves or a controllable three-way valve, as described above, can be controlled to select a regenerative mode during operation of the fluid consumer. This allows a relatively higher pressure from the fluid consumer to be regenerated by opening an appropriate controllable valve and returning pressurized fluid to the pressure connection. The desired direction of operation is selected, for instance, by an operator transmitting a control signal (not shown) to the electronic control unit ECU In the example shown in FIG. 5, the first conduit 105 can be a supply connection and the second conduit 106 can be connected to a fluid consumer (not shown). In order to perform the regenerative operation described above, the electronic control unit ECU must first receive a signal from the position sensor 505 indicating that the pressure in the second conduit 106 exceeds the pressure in the first conduit 105. If this is the case, the electronic control unit ECU transmits a signal to the first two-way valve 501 to open the valve arrangement for fluid flow in the direction towards the first conduit 105.

According to a further example, the position signal from the opening degree sensor 505 allows the electronic control unit ECU to determine if the second valve 502 can be opened to supply pressure to the fluid consumer, or whether pump actuation is required to maintain a desired pressure drop across the valve arrangement. If the electronic control unit ECU determines that the pressure in the supply conduit 105 is insufficient, it can transmit a signal to a controllable pump (not shown) to increase the supply pressure. Only when the pressure drop is at or near a desired value can the second two-way be actuated by the electronic control unit ECU in response to a control signal from an operator.

The invention is not limited to the embodiments and examples described above, but may be varied within the scope of the claims. Hence, other fixed or controllable valve combinations may replace the valves making up the fluid device indicated in FIGS. 4-6. The valve arrangement may also be located as to control the fluid flow between a fluid consumer and a tank.

What is claimed is:

1. A fluid valve arrangement comprising:
    a fluid conduit arrangement having a first conduit and a second conduit, the first conduit being connectable with a supply of fluid pressure and the second conduit being connectable with a hydraulic consumer;
    wherein the fluid valve arrangement includes a pressure controlling valve with a valve body having a slidable spool arranged to be spring loaded towards a neutral position in the valve body, a first port and a second port for a fluid, the first and second ports being connected to allow a fluid flow between the first port and the second port, a first pilot port connected to a cavity adjacent a first end surface of the spool, and a second pilot port connected to a cavity adjacent an opposite, second end surface of the spool, wherein the spool comprises a first control surface and a second control surface located in a first cavity and a second cavity, respectively, which first cavity and second cavity each has a cross-sectional area that is larger than the cross-sectional area of the spool; that the first cavity and the second cavity are connected by a third cavity, that the spool is operable to be displaced in response to a pressure difference between the first pilot port and the second pilot port that exceeds a predetermined value; and that the first control surface or the second control surface is arranged to restrict the fluid flow through the valve when the first control surface or the second control surface approaches the third cavity when the spool is displaced from the neutral position;
    a fluid device causing a pressure drop between the first and second fluid conduits, which fluid device is connected to one of the first and second ports of the pressure controlling valve, and that the pilot ports of the pressure controlling valve are connected to the fluid device, wherein the pressure controlling valve is arranged to control the pressure drop across the fluid device irrespective of the direction of fluid flow, the fluid device including a pair of controllable two-way valves connected in parallel;
    an electronic control unit (ECU) for controlling at least the fluid device; and
    an opening degree sensor which determines the position of the spool, the sensor being connected to the ECU.

2. A fluid valve arrangement according to claim 1, wherein the opening degree sensor is a position sensor.

3. A fluid valve arrangement according to claim 2, wherein the control device (ECU) is arranged to evaluate a non-linear correlation between the position of the spool and the opening degree of the valve arrangement as communicated by the position sensor.

4. A fluid valve arrangement according to claim 1, wherein the spool is spring loaded in a first direction by a first spring arranged at the first end of the spool and in an opposite, second direction by a second spring arranged at the second end of the spool.

5. A fluid valve arrangement according to claim 1, wherein each two-way valve includes an integrated non-return valve.

6. A fluid valve arrangement according to claim 2, wherein the position sensor is a Hall-sensor or a linear variable differential transducer (LVDT).

7. A fluid valve arrangement according to claim 1, wherein the ECU uses an output of the sensor to determine both the magnitude and the direction of a pressure drop across the valve.

8. A fluid valve arrangement according to claim 1, wherein the ECU controls the valve using a selected mode of operation that includes both a direction and a magnitude of a desired pressure drop across the valve.

9. A fluid valve arrangement according to claim 1, wherein the ECU is connected to each of the two-way valves to selectively open or close each of the two-way valves based on a selected mode of operation.

* * * * *